3,245,954
HYDROXY-CONTAINING POLYMERS OF MESITYL OXIDE
Elliot Bergman, Berkeley, and Paul A. Devlin, Orinda, Calif., assignors to Shell Oil Company, New York, N.Y., a corporation of Delaware
No Drawing. Filed Apr. 5, 1961, Ser. No. 100,802
6 Claims. (Cl. 260—66)

This invention relates to new hydroxy-containing polymers and their preparation. More particularly, the invention relates to new low mol weight polymeric materials substituted with a plurality of alcoholic OH groups, to their preparation from certain ethylenically unsaturated monomers, and to their utilization, particularly in the preparation of surface coating compositions.

Specifically, the invention provides new and particularly useful low molecular weight polyhydroxy-substituted polymeric materials which have superior properties in the formation of surface coating compositions. These new polyhydroxy-substituted polymers comprise the low molecular weight product of polymerization of a polyethylenically unsaturated hydrocarbon, and preferably butadiene, and allyl alcohol, which copolymers preferably contain at least 1% by weight, and more preferably from 3% to 25% by weight of the allyl alcohol. The invention further provides valuable derivatives of these new hydroxy-containing polymeric materials, and particularly those obtained by reacting the said materials with polyisocyanates, polycarboxylic acids, polyepoxides, alkylene oxides and the like.

As a preferred embodiment, the invention provides hydroxy-containing terpolymers having outstanding properties as can coatings which comprise the product of polymerization of a conjugated diolefin, and preferably butadiene, allyl alcohol, and mesityl oxide, the amount of the mesityl oxide making up at least 1 mol and preferably from 5 to 100 mols per mol of monomer to be polymerized. Valuable derivatives of these special terpolymers are also provided.

In order to permit the packaging of certain materials, such as soft drinks, in metal containers, it has been necessary to develop a new coating for the inside lining of the can. Such a coating must be such that it imparts no taste or contamination of the food material and must have the necessary physical properties to withstand the steps involved in manufacture of the can, such as soldering operations, sterilization of the can, processing of the filled can and the like. These require that the coating have good adhesion to the metal, good heat resistance, good flexibility and good resistance to solvents and alkali.

Many attempts have been made to prepare liquid resinous materials that could be used for the above can coating operations, but the results obtained heretofore have not been entirely satisfactory. In many cases, the resinous materials fail to have sufficient adhesion to the metal surfaces to withstand the many fabrication processes. In other cases, the resinous materials fail to impart the necessary chemical resistance, or failed to have the heat resistance required to withstand sterilization and soldering operations.

It is an object of the invention, therefore, to provide new hydroxy-containing polymeric products and a method for their preparation. It is a further object to provide new polymeric polyols which are particularly useful as coatings for cans. It is a further object to provide new polymeric polyols which have excellent adhesion to metal surfaces. It is a further object to provide new hydroxy-containing polymeric products which can be baked on metal surfaces to give coatings having good resistance to chemicals and to heat. It is a further object to provide new liquid low molecular weight polymers of conjugated diolefins and allyl alcohol. It is a further object to provide new liquid resinous polyols which are particularly useful for making valuable derivatives. It is a further object to provide new polymeric polyols which are useful in the preparation of derivatives such as polyisocyanates and the like. These and other objects of the invention will be apparent from the following detailed description thereof.

It has now been discovered that these and other objects may be accomplished by the new hydroxy-containing polymeric products of the invention which comprise the low molecular weight product of polymerization of a polyethylenically unsaturated hydrocarbon, and preferably butadiene, and allyl alcohol, which copolymers preferably contain at least 1% by weight of allyl alcohol, and more preferably from 3% to 25% by weight of polymerized allyl alcohol units. It has been found that these special polymeric products have surprising properties as coatings materials. Materials prepared from say 3% to 15% of allyl alcohol are particularly outstanding as coatings as they, for example, can be applied in liquid form to metal surfaces and cured thereon to form hard, solvent resistant and heat resistant films. These special coatings have particularly outstanding adhesion to the metal and the coated metal can be employed in the standard fabrication processes without danger of the removal of the film.

The diolefin-allyl alcohol copolymers prepared according to the present invention have an unexpected and highly desirable physical property, namely a sharp temperature coefficient of viscosity. This is important in applications such as solventless surface coatings, i.e., materials which can be calendered onto surfaces without being dissolved in a solvent. As these polymers drop in viscosity rapidly as the temperature is elevated, it is easy to apply them at slightly elevated temperatures without the use of solvents.

The new terpolymers of the invention comprising the product of polymerization of the conjugated diolefin, allyl alcohol and mesityl oxide have particularly outstanding properties as can coatings, particularly in their adhesion, flexibility and resistance to heat.

The polyethylenically unsaturated hydrocarbon to be copolymerized with the allyl alcohol according to the process of the present invention include the hydrocarbons and preferably the aliphatic hydrocarbons having at least two ethylenic groups in conjugated relationship. Examples of this include, among others, butadiene-1,3, isoprene, dimethylbutadiene, 2,4-hexadiene, 1,3-heptadiene, and the like. Especially preferred are the conjugated diolefins containing up to 10 and preferably from 4 to 6 carbon atoms and wherein at least one of the double bonds is terminal.

The new polymeric products of the invention can be prepared by a variety of different techniques. They are preferably prepared by heating and reacting the polyunsaturated hydrocarbon with the allyl alcohol in the presence of a liquid material which contains active hydrogen atoms and in the presence of a free-radical catalyst.

The materials having the active hydrogen which are preferably employed in the process include the liquid materials as 4-vinylcyclohexene-1, mesityl oxide, d-limonene, and the like.

The amount of the material having active hydrogen which are employed in the process of the invention will vary over a wide range depending upon the molecular weight of the polymer desired and, in the case of materials, such as mesityl oxide, the properties desired in the finish product. In general, the amount of this material will vary from about 1 to 100 mols of the material to be polymerized and preferably from 5 to 100 mols per mol of monomer. It is preferred to maintain this ratio during course of polymerization by adding the said material having active hydrogen intermittently or continuously during the course of the reaction.

Depending upon the application to which the polymeric product is to be applied, the proportion of the allyl alcohol is varied to considerable extent in the mixture subject to copolymerization. In some cases, it is desirable to have a polymeric product having a large OH content while in others, the OH content can be very small. Preferably, for applications, such as can coatings, the polymeric product should contain from 1% to 30% by weight of the allyl alcohol units, and 70% to 99% by weight of diolefin, and still more preferably from 3% to 15% by weight of the allyl alcohol units, and from 99% to 85% by weight of diolefin.

The special terpolymers prepared from the mesityl oxide, preferably contain from .2% to 30% by weight of the mesityl oxide, from 2% to 30% of allyl alcohol and from 97.8% to 40% by weight of the polyunsaturated hydrocarbon, with the total weight of polymer being 100%. Particularly outstanding products are those having 3% to 15% allyl alcohol, 1% to 15% mesityl oxides and 96% to 70% diolefin, percent being by weight.

It is also desirable to include minor amounts, e.g., 1% to 30% by weight of other unsaturated monomers, such as, for example, acrylic and methacrylic acid, styrene, acrylonitrile, methyl methacrylate, ethylene, propylene, vinyl acetate and the like, to obtain modified products.

The polymerization catalysts employed in the process are preferably the free-radical polymerization catalysts, and particularly the peroxide catalysts, i.e., those having an oxygen atom linked directly to another oxygen atom. Examples of these catalysts include, among others, benzoyl peroxide, acetyl peroxide, cumene hydroperoxide, lauroyl peroxide, tertiary-butyl hydroperoxide, di-tertiary-butyl peroxide, 2,2-bis(tertiary-butyl peroxy)butane, dicumyl peroxide, di-tert-amyl peroxide, and peresters, as tert-butyl peracetate, tert-butyl perbenzoate and the like, as well as molecular oxygen, relatively pure or diluted with inert gas, e.g., nitrogen, methane, etc. When using peroxides, about 0.1% to 5% is suitable, although larger or smaller proportions may be employed if desired. Molecular oxygen is used as catalysts by bubbling or dispersing the gas into and through the liquid polymerization mixture.

The polymerization is conducted with the polymerizing mixture in liquid phase at about 50° C. to 250° C. Ordinary reflux temperature is often convenient although this temperature is sometimes too low to effect the copolymerization with desired rapidity. Consequently, it is sometimes preferable to operate at higher temperatures where it may be necessary to employ superatmospheric pressures, such as from about 100 to 400 pounds per square inch or even higher in order to keep the polymerizing mixture in the liquid phase.

In some cases, the polymerization is effected by adding one or more of the compounds to the polymerizing mixture during the course of the copolymerization. This procedure is especially useful with mixtures wherein one compound polymerizes at a much faster rate than the other. In some cases, the faster polymerizing compound is added continuously or intermittently during the copolymerization.

In preparing the polymeric products, the polymerization of the entire mixture is ordinarily not carried to completion. Instead, copolymerization is usually continued until about 10% to 80% of the monomer mixture is converted to polymer and then the unpolymerized monomer or diluent are separated from the formed polymer by distillation, preferably under reduced pressure. The polymer obtained in this manner is substantially free of unpolymerized monomer and solvents, if the latter is employed.

The preparation process can be conducted in a batchwise, semi-continuous or continuous manner. In continuous operation, the mixture of monomers, catalyst, etc. may be continuously passed through a hot tube and then into column for separation of the solvent, etc. with the solvent and unreacted monomer being recycled to the reaction zone. This technique is preferred for commercial operations where uniformity of product is essential.

The new polymeric products of the invention will vary from liquids to soft solids, with the preferred products being in the liquid form. They preferably have viscosities of not more than 30 poises at 60° C. The new products have low molecular weights, e.g., molecular weights below about 25,000, and preferably between 500 and 10,000. These molecular weights are determined ebullioscopically in solvents, such as dichloroethane. The new products are soluble in conventional hydrocarbon solvents, such as toluene, benzene, and the like, and compatible with various natural and synthetic oils, resins, tars and pitches, such as, for example, phenol-aldehyde resins, coal tars, coal tar pitches, drying oils, and the like.

The new products have active OH groups and active ethylenic groups, both groups being capable of entering into further chemical reaction, and particularly into cross-linking reactions as noted hereinafter.

The new polymeric products can be used for a variety of applications. As noted herein above, they are particularly outstanding in the preparation of surface coatings and particularly can coatings. Such coatings may be colorless varnishes for coating of metal, wood and the like or as pigmented coatings and enamels. The polymers are particularly suited for use in coating metals, such as those used in making metal containers, as they have good adhesion to metal and form coatings having excellent resistance to chemicals and good resistance to heat. In making coatings of this type, the polymeric products, if in liquid form, may be used as such or they may be dissolved in a suitable solvent and any desired drier, such as cobalt salts and the like added. This mixture may then be applied to the metal by dipping, painting, rolling, spraying or any other suitable means. The coating is then preferably subjected to heat to effect cure. Temperatures used in these applications generally range from about 200° C. to about 450° C. Cure times range from about 5 minutes to about 30 minutes. The cure of the coating may be accomplished at lower temperatures and generally in thicker films by the addition of driers, such as cobalt driers, in amounts generally ranging from about .001% to 1% by weight.

Baked enamels may be prepared from the new polymers by adding pigments, such as titanium dioxide, driers and the like.

The new polymeric products of the invention are particularly suited for use in preparing polyurethanes for use in coatings, foamed or cellular materials and the like. The products prepared from these materials have good flexibility and distensibility as well as good structural strength. These products are prepared by reacting the new hydroxy-containing polymers with a polyisocyanate or polyisothiocyanate. These compounds generally have the formula XCNRNCY wherein X and Y are selected from the group consisting of sulfur and oxygen and R is a divalent organic radical. The organic radical may be aliphatic, cycloaliphatic, aromatic, or heterocyclic and may be saturated or unsaturated. Examples of these compounds include, among others, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, hexamethylene diisocyanate, ethylene diisocyanate, cyclohexylene diisocyanate, octamethylene diisocyanate, pentamethylene diisocyanate, nonmethylene diisocyanate, octodecamethylene diisocyanate, 2-chloropropane diisocyanate, 2,2'-diethylether diisocyanate, 3(dimethylamino)pentane-diisocyanate, tetrachloro-phenylene diisocyanate-1,4. Still other polyisocyanates or polyisocyanates that may be used are the higher molecular weight polyisocyanates obtained by reacting polyhydric alcohols, such as alkane and alkene polyols as glycerol, 1,2,6-hexanethanol, 1,5-pentanediol, ethylene glycol, polyethylene glycol, and the like with an excess of any of the above-described isocyanates.

Preferred organic polyisocyanate and polyisothiocyanate comprise the alkenyl diisocyanate and diisothiocyanate and the aromatic diisocyanate and diisothiocyanate preferably containing not more than 20 carbon atoms and preferably from 2 to 15 carbon atoms, such as, for example, pentamethylene diisocyanate, octamethylene diisocyanate, phenylene diisocyanate, durene diisocyanate, and 4,4'-diphenyldiisocyanate.

It is also desirable in some cases to add monoisocyanates along with the polyisocyanates to modify the properties and/or control molecular weight. Examples of these compounds include benzene monoisocyanate, hexane monoisocyanate, butane monoisocyanate and cyclohexane monoisocyanate.

The reaction between the organic polyisocyanate or polyisothiocyanate and the above described resinous polyols may be carried out in a variety of ways. Reaction is preferably accomplished by merely mixing the two or more reactants together and heating the mixture to its desired temperature.

The proportions in which the reactants may be combined can be varied widely, depending chiefly on the intended applications. If one desired to utilize the product in the formation of coating and impregnating compositions, such as may be air dried or baked, it is generally preferred to employ the reactants in chemically equivalent amounts up to a slight excess, e.g., 1 equivalent excess, of the polyisocyanate or polythioisocyanate. As used herein and in the claims chemically equivalent amounts refers to the amount needed to furnish one isocyanate group per hydroxyl group. If one desires to first form higher molecular weight products having free isocyanate groups which may be subsequently cured by contact with moisture or other means, it is generally desirable to utilize a large excess of the polyisocyanate or polythioisocyanate. As used herein and in the claims chemically equivalent amounts refers to the amount needed to furnish one isocyanate group per hydroxyl group. If one desires to first form higher molecular weight products having free isocyanate groups which may be subsequently cured by contact with moisture or other means, it is generally desirable to utilize a large excess of the polyisocyanate or polythioisocyanate. In this latter case, it is generally preferred to combine the polyol and the isocyanate reactant in chemical equivalent ratios varying from about 1:2 to 1:5. Hydroxy-containing higher molecular weight products can be obtained by utilizing the resinous polyol in excess, e.g., 1 to 3 mol excess.

Catalysts may be employed in the reaction as desired. Preferred catalysts include tertiary amines, such as triethylamine, benzyldimethylamine, tributylamine, and the like. These are preferably utilized in amounts varying from about .1% to 5% by weight of the reactants.

The reactions may be accomplished in the presence or absence of diluents. Preferred diluents include the hydrocarbons, such as aliphatic, cycloaliphatic and aromatic hydrocarbons as benzene, toluene, cyclohexane, hexane, heptane and the like, but other diluents, such as methyl isobutyl ketone and diamyl ketone can also be utilized if desired.

The temperature employed in the reaction may also vary over a wide range. If one desires to prepare mixtures for use in making coatings as desired above wherein the components are combined in approximately chemical equivalent amounts or with slight excess of the isocyanate reactant, it is preferred to use temperatures which may vary from room temperature or below, e.g., 10° C. to 15° C., up to and including baking at temperatures of 100° C. to 175° C. In this case, the components are preferably combined at or near room temperature, such as temperatures ranging from 15° C. to 25° C. In the preparation of the isocyanate adducts using a large excess of the isocyanate, the reactants may be combined at room temperature or preferably heated say at temperatures ranging from about 40° C. to about 150° C.

It is sometimes advantageous to carry out the reaction under a blanket of inert gas, such as nitrogen, carbon dioxide, ethane and the like. Atmospheric, superior atmospheric or subatmospheric pressures may be employed.

In the preparation of the new products and preferably in the preparation of these to be used for surface coatings and foams, other materials may be added, such as wetting agents, stabilizers, plasticizers, and the like, as well as other synthetic resins, oils and the like.

The process of the invention can be used to produce a variety of products. When the reactants are used in such proportions as to effect gelation and cross-linking, e.g., when using a trifunctional material as trimethylol propane, the process may be used directly to prepare surface coatings, foams, castings and the like. When the reactants are used to form linear type polymeric products, they can be further reacted, such as with water or other polyols and the like, to form materials useful for surface coatings, foams and the like.

When used to prepare surface coatings, it is preferred to combine all the desired reactants and other materials in a solvent and then apply this mixture to the desired surface, such as wood, metal, plaster and the like. The coatings may be allowed to air dry or they may be baked at temperatures say from 100° C. to 200° C. for a short period.

When used to prepare foamed or cellular materials, one may first form a prepolymer and then use this in the preparation of the foam or all the reactants may be combined together. In making the foams, the resinous polyols, polyisocyanate or polyisothiocyanate are preferably mixed with water (e.g., .1 to 2% by weight based on the weight of reactants) and preferably an amine catalyst, such as N-ethyl morpholine, dimethyl ethanolamine or methyl diethanolamine, and a surface active or wetting agent, such as dioctyl ester of sodium sulfosuccinic acid. This mixture is then poured into the mold and heated, say to temperatures ranging from about 40° C. to 150° C.

The new hydroxy-containing polymers may also be reacted with alkaline oxides, such as ethylene oxide, propylene oxide, butylene oxide, amylene oxide, octylene oxide and the like, in the presence of alkylene catalysts to form adducts are particularly used as modified resinous polyols as additives for surface coating compositions and particularly those containing aminoplasts, i.e., soluble resinous materials, such as aldehyde resins formed with melamine, urea, guanamine, ammeline, cyanuric acid, biuret, dicyandiamide, and the like. In the most preferred embodiment the aldehyde is formaldehyde although it is appreciated that other aldehydes may also be employed in the preparation of the aminoplasts. In preparing the coating compositions, it is generally preferred to dissolve the alkylene oxide adduct and the aminoplast in a common solvent, such as xylene. A small amount of a catalyst was added and the mixture then applied as a film by spraying, dipping, rolling or the like followed by baking at elevated temperatures whereby solvents are evaporated. Baking temperatures ranging from about 225° F. to about 325° F. are particularly preferred.

The new polymers are also useful in preparation of adhesives and may be cross-linked with peroxides to form solid plastic articles. They may also be cross-linked by reaction with polyepoxides as noted in U.S. 2,633,354. The new polymers may also be reacted with peracetic acid to form polyepoxide materials that may be subsequently cured with epoxy curing agents to form coatings and adhesive materials.

The new hydroxy-containing polymers can also be used to form new derivatives by addition at the double bonds of various components, such as mercaptans and the like.

The new polymers of the invention are distinguished in that they can be self-cured by contact with acidic catalysts, such as boron trifluoride, hydrogen bromide, hydrogen chloride, trifluoroacetic acid and the like.

The new polymers may also be utilized to produce valuable ester derivatives. These derivatives are preferably prepared by reaction with the desired acid anhydride. Examples of such anhydrides include among others, acetic anhydride, propionic anhydride, maleic anhydride, phthalic anhydride, tetrahydrophthalic anhydride, fumaric anhydride, pyromellitic dianhydride, tetrachlorophthalic anhydride, and the like. Preferred anhydrides to be used for this purpose include the anhydrides of alkanoic, alkanedioic acid, cycloalkanedioic acids and aromatic hydrocarbon polycarboxylic acids, said acids preferably containing no more than 12 carbon atoms. These ester derivatives are preferably obtained by reaction with the polymers in approximately chemically equivalent amounts at reflux or lower temperatures.

The ester derivatives prepared from the monocarboxylic acid anhydrides, such as acetic acid anhydride are useful as polymeric plasticizing materials for components, such as polyvinyl chloride and the like. The cured products prepared from the polymers and the polycarboxylic acid anhydrides may be used in the preparation of plastic articles, coatings and the like.

The curing of the new polymers with polybasic acid anhydrides as noted above may also be modified by the inclusion of polyepoxides, and preferably the glycidyl polyethers of polyhydric phenols and polyhydric alcohols, as well as the epoxidized products as epoxidized methyltetrahydrobenzyl methyltetrahydrobenzoate, drying oils, bis(cyclohexenyl)propane and the like.

The new polymers may also be hydrogenated to form substantially saturated or partially saturated polyols which may be used as such or for making many derivatives as in the formation of polyurethanes, polyesters, synthetic drying oils from fatty acids and the like.

To illustrate the manner in which the invention may be carried out, the following examples are given. It is understood, however, that the examples are for the purpose of illustration, and the invention is not to be regarded as limited to any of the specific conditions cited therein. The molecular weights reported in the examples were determined ebullioscopically in dichloroethane unless otherwise indicated. Parts are parts by weight.

*Example I*

This example illustrates the preparation of a liquid copolymer of butadiene and allyl alcohol.

1 mol of butadiene was mixed with 2 mols of allyl alcohol and the mixtures combined with 1-vinylcyclohexene-3 solvent so as to give a mixture having the monomer and solvent in a weight ratio of 1.00. 0.8 percent ditertiary butyl peroxide was then added and the mixture heated in an inert atmosphere at 140° C. for about 2 hours. The vinylcyclohexene was then distilled off leaving a viscous liquid copolymer. Infra-red analysis indicated the copolymer contained 92% butadiene and 8% allyl alcohol. 82% of the butadiene units were in the 1,4-structure. The molecular weight of the liquid copolymer was approximately 1320 and the iodine number was 410.

The above copolymer was fluid at elevated temperature and could be applied as a coating without the use of solvents.

The above copolymer was dissolved in xylene and thin film applied to tin plate. The coated plate was heated at 400° F. for 15 minutes. The resulting coating had good adhesion, was hard but flexible and had excellent resistance to hot solder and good resistance to solvents and to impact.

.05% cobalt as cobalt naphthenate was added to a xylene solution of the above copolymer and the mixtures spread on tin plate panels and allowed to air dry. The resulting film had good adhesion, was insoluble and had good flexibility and impact resistance.

Related results are obtained by replacing the 1-vinylcyclohexene-3 with d-limonene. Related results are obtained.

*Example II*

This example illustrates the preparation of a copolymer of isoprene and allyl alcohol.

1 mol of isoprene was mixed with 10 mols of allyl alcohol and 2% by weight of tertiary butyl hydroperoxide. This mixture was heated in an inert atmosphere at 140° C. for about 2 hours. The solvent was then distilled off. The resulting liquid copolymer contained 78% isoprene and 22% allyl alcohol and had a mol weight of 1000. Iodine number 316.

The above copolymer was dissolved in xylene and a thin film applied to tin plate. The coated plate was heated at 400° F. for 15 minutes. The resulting coating was hard but flexible and showed excellent resistance to hot solder and good resistance to solvent and impact.

0.05% cobalt as cobalt naphthenate was added to a xylene solution of the above polymer and the mixture spread on tin plate panels and allowed to air dry. The resulting film was insoluble and had good flexibility and impact resistance.

*Example III*

This example illustrates the preparation of a terpolymer of butadiene, allyl alcohol and mesityl oxide.

To a 100 gallon reactor, 200 pounds of allyl alcohol and 300 pounds of mesityl oxide were charged together with an anti-foaming agent. This mixture was then heated to 142° C., at which time 6 pounds of di-tert-butyl peroxide catalyst was initially added and added at 2.5 pounds per hour during the reaction period. The butadiene was at this time also introduced into the reactor held at 140° C. for an additional hour. At the end of 4.9 hours, the reactor was then cooled to 90° C. and the unreacted butadiene vented off. The unreacted monomers were then stripped at full vacuum at 150–155° C. with nitrogen sparging. Approximately 141 pounds of liquid polymer were obtained having a viscosity of 180 poises at 25° C. and a molecular weight of 1260 as determined ebullioscopically in dichloroethane. The product contained 7.7% allyl alcohol, 12.8% mesityl oxide, 79.5% butadiene. The hydroxyl was 0.132 eq./100 g. and the carbonyl was 0.131 eq./100 g.

The liquid polymer prepared above is used as a coating for metal as described in Example I. The resulting coating has good adhesion and good solvent and heat resistance.

Related results are obtained by replacing the butadiene with equivalent amount of isoprene.

*Example IV*

This example illustrates the preparation of a polyurethane from the allyl alcohol-butadiene copolymer defined in Example I and toluene diisocyanate.

10.5 parts of the copolymer defined in Example I was dissolved in toluene to form a 40% solution. 4.5 parts of toluene diisocyanate were then added.

The toluene solution of the polyol-diisocyanate mixture prepared above was spread on tin panels and allowed to air-dry. In 33 minutes the coating was dried hard. The coating had good resistance to solvents and water.

*Example V*

Examples I to III are repeated with the exception that 5% by weight of the butadiene is replaced by 5% by weight of styrene. The resulting polymers containing bound styrene have related properties as coatings for metal.

*Example VI*

This example illustrates the preparation of a copolymer of butadiene and allyl alcohol.

To a 100-gallon reactor, 480 pounds of allyl alcohol and 140 pounds of butadiene and an anti-foaming agent were added. This mixture was heated to 141° C. at which time about 6 pounds of ditertiary-butyl peroxide catalyst was added and 2.5 pounds added per hour during the reaction period. At the end of 4.5 hours, the reaction was stopped and the unreacted monomers stripped at 150° C. at full vacuum with nitrogen sparging. The resulting product was a liquid polymer of butadiene and allyl alcohol having a hydroxy value of 0.28 eq./100 g., and a molecular weight of 1375.

This liquid polymer is used as a coating for metal as described in Example I. Related results are obtained.

*Example VII*

Example VI was repeated with the conditions and results shown in the following table:

| Charge, lbs. | | | Reaction time | Temp., °C. | OH value | Molecular weight |
|---|---|---|---|---|---|---|
| AA | BD | DTBP | | | | |
| 480 | 140 | 18.7 | 4.7 | 140 | 0.32 | 1,215 |
| 516 | 140 | 19.7 | 5.5 | 145 | 0.37 | 1,140 |
| 520 | 120 | 19.1 | 3.3 | 135 | 0.28 | 1,115 |
| 520 | 120 | 24.3 | 4.7 | 136 | 0.337 | 975 |
| 520 | 120 | 17.5 | 2.9 | 136 | 0.226 | 1,300 |

AA—allyl alcohol. BD—butadiene. DTBP—ditertiary-butyl peroxide.

*Example VIII*

Example III was repeated with the exception that the charge consisted of 21 pounds allyl alcohol, 120 pounds butadiene, 479 pounds mesityl oxide and 11.6 pounds of ditertiary butyl peroxide. The resulting product was a terpolymer having a molecular weight of 1780, an OH value of 0.105 eq./100 g. and carbonyl value of 0.088 eq./100 g.

This product was also used for the preparation of a coating composition as in Example I.

*Example IX*

This example illustrates the acetylation of a butadiene-allyl alcohol copolymer.

15 parts of a copolymer of butadiene and allyl alcohol having a hydroxy value of 0.049 eq./100 g. was refluxed with 100 parts (0.98 mole) of acetic anhydride under a nitrogen blanket. After 2 hours, the excess anhydride and acetic acid were stripped off to 145° C./1.5 mm. to leave 17 parts of a clear fluid sweet smelling ester.

*Analysis.*—Found 77.7% C.; 10.0% H; ester, 0.361 eq./100 g.; hydroxyl, 0.0075 eq./100 g.; acidity 0.004 eq./100 g.; iodine No. 284.

This ester-containing polymer is useful as a plasticizing material.

*Example X*

This example illustrates the hydrogenation of a butadiene-allyl alcohol copolymer.

A solution of 15 parts of a copolymer of 80% butadiene and 20% allyl alcohol was dissolved in 100 parts of dioxane and hydrogenated at 25° C./3 atm. over 0.2 parts platinum oxide catalyst. The reaction was essentially complete in 3 hours and 50 minutes. In similar experiments, partially hydrogenated butadiene-allyl alcohol polymers were obtained. Such hydrogenated and partially hydrogenated polymers are useful for the preparation of polyurethanes as noted above.

*Example XI*

This example illustrates the curing of a butadiene-allyl alcohol liquid polymer with maleic anhydride.

0.75 part of maleic anhydride was mixed with 3.20 parts of a copolymer of butadiene and allyl alcohol (0.0104 eq./100 g. hydroxy value) and the mixture was heated in a silicone treated mold at 110° C. for 2 hours followed by 235° C. for 2 hours. The mixture cured to a clear hard casting.

Similarly 4.75 parts of the polymer and 0.75 part of phthalic anhydride gave a soft resilient casting.

*Example XII*

This example illustrates the curing of a butadiene-allyl alcohol liquid polymer with a glycidyl polyether of 2,2-bis(4-hydroxyphenyl)propane having an epoxy value of 0.50 eq./100 g. and phthalic anhydride.

5 parts of a butadiene-allyl alcohol copolymer having a hydroxyl value of 0.015 eq./100 g., 3.3 parts of the glycidyl polyether and 1.66 parts of phthalic anhydride and 0.1 part of benzyldimethylamine catalyst were mixed and heated at 110° C. for 6 hours to yield a hard casting with notable impact resistance i.e., it could be thrown against the floor with considerable force without breaking.

The above experiment was repeated with the polymer of butadiene-alcohol (10 parts), glycidyl polyether (6.5 parts) and boron trifluoride etherate (0.1 part). The mixture was cured at room temperature. The product had the following analysis 75.8% C., 8.9% H.

We claim as our invention:

1. A liquid terpolymer composition consisting of a low molecular weight product of polymerization of allyl alcohol, mesityl oxide and a conjugated diene containing up to 10 carbon atoms, said terpolymer containing 1% to 40% by weight of allyl alcohol and from about .2% to about 35% by weight of combined mesityl oxide, said terpolymer having a molecular weight between 500 and 10,000.

2. A terpolymer composition as in claim 1 wherein the product is a liquid terpolymer having a molecular weight from about 600 to about 8000.

3. A liquid low molecular weight terpolymer of butadiene, allyl alcohol and mesityl oxide and containing 1% to 40% allyl alcohol and from about .2% to about 35% by weight of combined mesityl oxide, said terpolymer having a molecular weight below 25,000.

4. A liquid low molecular weight terpolymer of allyl alcohol, mesityl oxide and isoprene, said terpolymer containing 1% to 40% allyl alcohol and from about 1% to 35% by weight of combined mesityl oxide, and said terpolymer having a mol weight between 500 and 10,000.

5. A liquid low molecular weight polymer of butadiene, styrene, allyl alcohol and mesityl oxide, said polymer containing 1% to 40% bound allyl alcohol, from about .2% to 35% bound mesityl oxide and having a molecular weight between 500 and 10,000.

6. A process for preparing hydroxy-containing polymers having a molecular weight below 25,000 which comprises heating a mixture of from 40% to 97.8% by weight of a conjugated diolefin, from 2% to 30% by weight of allyl alcohol and from 0.2% to 30% by weight of mesityl oxide in the presence of a peroxide catalyst at a temperature between 50° C. and 250° C. until a liquid terpolymer is obtained.

References Cited by the Examiner

UNITED STATES PATENTS

| 2,349,136 | 5/1944 | Britton et al. | 260—91 |
| 2,419,221 | 4/1947 | Kenyon et al. | 260—85.7 |
| 2,877,212 | 3/1959 | Seligman | 260—77.5 |
| 2,894,938 | 7/1959 | Chapin et al. | 260—23 |
| 2,922,768 | 1/1960 | Mino et al. | 260—91.3 |
| 2,951,831 | 9/1960 | Reinhard et al. | 260—80.7 |
| 2,986,580 | 5/1961 | Delvin | 260—63 |

OTHER REFERENCES

Marvel et al., Journal American Chemical Society, vol. 77, pages 177–8 (1955).

LEON J. BERCOVITZ, *Primary Examiner.*

HAROLD N. BURSTEIN, *Examiner.*

J. T. BROWN, J. J. KLOCKO, *Assistant Examiners.*